(12) United States Patent
Jin

(10) Patent No.: US 10,963,935 B2
(45) Date of Patent: Mar. 30, 2021

(54) USER RECOMMENDATION METHOD AND DEVICE

(71) Applicant: ALIBABA GROUP HOLDING LIMITED, Grand Cayman (KY)

(72) Inventor: Yu Jin, Hangzhou (CN)

(73) Assignee: ALIBABA GROUP HOLDING LIMITED, Grand Cayman (KY)

(*) Notice: Subject to any disclaimer, the term of this patent is extended or adjusted under 35 U.S.C. 154(b) by 178 days.

(21) Appl. No.: 15/813,984

(22) Filed: Nov. 15, 2017

(65) Prior Publication Data

US 2018/0075504 A1 Mar. 15, 2018

Related U.S. Application Data

(63) Continuation of application No. PCT/CN2016/083593, filed on May 27, 2016.

(30) Foreign Application Priority Data

Jun. 4, 2015 (CN) .......................... 201510303049.9

(51) Int. Cl.
G06Q 30/00 (2012.01)
G06Q 30/06 (2012.01)
H04L 12/58 (2006.01)
H04L 29/08 (2006.01)

(52) U.S. Cl.
CPC ..... *G06Q 30/0613* (2013.01); *G06Q 30/0631* (2013.01); *H04L 51/046* (2013.01); *H04L 67/02* (2013.01); *H04L 67/141* (2013.01)

(58) Field of Classification Search
CPC ................................................. G06Q 30/0613
See application file for complete search history.

(56) References Cited

U.S. PATENT DOCUMENTS 7,769,764 B2 8/2010 Ramer et al.
8,914,399 B1 12/2014 Paleja et al.
9,189,768 B2 11/2015 Plaster et al.
(Continued)

FOREIGN PATENT DOCUMENTS

CN 101083581 A 12/2007
CN 101790740 A 7/2010
(Continued)

OTHER PUBLICATIONS

Lin, Chen-Tan, et al. "An Internet-based patient-provider communication system: randomized controlled trial." Journal of medical Internet research 7.4 (2005): e47.*
(Continued)

*Primary Examiner* — Kathleen Palavecino

(57) ABSTRACT

The present disclosure provides a method and a device for user recommendation. The method may comprise: detecting a browsing event with respect to an interaction object; obtaining a provider user of the interaction object and in a communication-enabled state; and recommending information of the provider user to an initiator user of the browsing event for causing the initiator user to initiate a communication event with respect to the interaction object to the provider user. The technical solutions of the present disclosure can achieve matching between interaction users and facilitate the improvement of interaction efficiency.

15 Claims, 6 Drawing Sheets

102: Detecting a browsing event with respect to any interaction object

104: Obtaining one or more provider users of the any interaction object and in a communication-enabled state 106: Recommending information of the provider users to an initiator user of the browsing event, causing the initiator user to initiate a communication event with respect to the any interaction object to the provider users

(56) References Cited

U.S. PATENT DOCUMENTS

| | | |
|---|---|---|
| 2002/0019786 A1 | 2/2002 | Gonzalez et al. |
| 2002/0198882 A1 | 12/2002 | Linden et al. |
| 2003/0236710 A1 | 12/2003 | Tong et al. |
| 2004/0015454 A1 | 1/2004 | Raines et al. |
| 2004/0088179 A1 | 5/2004 | Cogen et al. |
| 2005/0193002 A1 | 9/2005 | Soulders et al. |
| 2006/0015424 A1 | 1/2006 | Harvey et al. |
| 2007/0060099 A1 | 3/2007 | Ramer et al. |
| 2007/0162372 A1 | 7/2007 | Anas |
| 2009/0287520 A1 | 11/2009 | Zimmerman |
| 2010/0063877 A1 | 3/2010 | Soroca et al. |
| 2011/0010208 A1 | 1/2011 | Yekutiely |
| 2011/0071899 A1 | 3/2011 | Robertson et al. |
| 2012/0265561 A1* | 10/2012 | Patro ............... G06Q 30/06 705/5 |
| 2012/0316960 A1 | 12/2012 | Yang |
| 2012/0323619 A1 | 12/2012 | Risz et al. |
| 2013/0035973 A1 | 2/2013 | Desai et al. |
| 2013/0046717 A1* | 2/2013 | Grigg ............... G06Q 30/02 706/46 |
| 2013/0046772 A1* | 2/2013 | Gu .................. G06Q 30/0201 707/751 |
| 2013/0060576 A1* | 3/2013 | Hamm ............... G16H 40/67 705/2 |
| 2013/0090972 A1 | 4/2013 | Shin et al. |
| 2013/0204738 A1 | 8/2013 | Artun et al. |
| 2013/0252637 A1 | 9/2013 | Cha et al. |
| 2013/0304539 A1 | 11/2013 | Cheng |
| 2014/0046792 A1* | 2/2014 | Ganesan ........... G06Q 30/0611 705/26.4 |
| 2015/0112840 A1 | 4/2015 | Sasaki et al. |
| 2019/0102395 A1* | 4/2019 | Kshetramade ...... G06Q 50/01 |

FOREIGN PATENT DOCUMENTS

| | | |
|---|---|---|
| CN | 102819804 A | 12/2012 |
| CN | 103426096 A | 12/2013 |
| CN | 103593794 A | 2/2014 |
| CN | 104038909 A | 9/2014 |
| CN | 104205153 A | 12/2014 |
| JP | 2002-099792 A | 4/2002 |
| JP | 2003-331188 | 11/2003 |
| KR | 10-0975724 B1 | 8/2010 |

OTHER PUBLICATIONS

International Search Report and Written Opinion for Application No. PCT/CN2016/083593, dated Sep. 1, 2016, 9 pages.

International Preliminary Report on Patentability Chapter I for PCT Application No. PCT/CN2016/083593 dated Dec. 14, 2017 (12 pages).

First Search for Chinese Application No. 201510303049.9 dated Oct. 25, 2018 (1 page).

First Office Action for Chinese Application No. 201510303049.9 dated Dec. 3, 2018 (6 pages).

Notice of Reasons for Refusal for Japanese Application No. 2017-562738 dated Dec. 17, 2019 with English machine translation (6 pages).

Office Action for Japanese Application No. 2017-562738 dated Dec. 17, 2019 (5 pages).

Supplementary Search Report for Chinese Application No. 201510303049.9 dated Nov. 4, 2020, 1 page.

* cited by examiner

USER RECOMMENDATION METHOD AND DEVICE

CROSS-REFERENCE TO RELATED APPLICATIONS

The present application is a continuation application of International Patent Application No. PCT/CN2016/083593, filed May 27, 2016, which is based on and claims priority to the Chinese patent application entitled "User Recommendation Method and Device," filed with the Chinese Patent Office on Jun. 4, 2015 with the application No. 201510303049.9. Both of the above-referenced applications are incorporated herein by reference in their entirety.

TECHNICAL FIELD

The present application relates to the field of network technologies, and in particular to methods and devices for user recommendation.

BACKGROUND

In the related art, an interaction platform is provided to users, and corresponding object interactions can be executed via the interaction platform between any users. As online browsing of interaction objects can be carried out only on the interaction platform, users may conduct online communications among themselves with respect to an interaction object to further confirm the conditions of the interaction object.

SUMMARY

In view of this, the present disclosure provides methods and devices for user recommendation, which can achieve matching between interaction users, thereby facilitating the improvement of interaction efficiency.

To achieve the above goal, the present disclosure provides the following technical solutions.

According to one aspect of the present disclosure, a user recommendation method comprises: detecting a browsing event with respect to an interaction object; obtaining one or more provider users of the interaction object and in a communication-enabled state; and recommending information of the provider users to an initiator user of the browsing event for causing the initiator user to initiate a communication event with respect to the interaction object to the provider users.

In some embodiments, the obtaining one or more provider users of the interaction object and in a communication-enabled state comprises: determining a first provider user to which the interaction object in the browsing event belongs; and in response to that the first provider user is in a communication-disabled state, obtaining one or more second provider users of the interaction object and in the communication-enabled state.

In some embodiments, the method further comprises: recommending the provider users in the communication-enabled state to the initiator user; selecting a corresponding provider user from the recommended provider users according to a selection instruction input by the initiator user; and establishing a communication event with respect to the interaction object between the initiator user and the selected provider user.

In some embodiments, the method further comprises: sending an interaction notice of the browsing event to the provider users in the communication-enabled state, respectively; and according to responses to the interaction notice by the provider users in the communication-enabled state, recommending one of the provider users to the initiator user.

In some embodiments, the according to responses to the interaction notice by the provider users in the communication-enabled state, recommending one of the provider users to the initiator user comprises: obtaining characteristic description information of the initiator user; and recommending one of the provider users to the initiator user, according to responses to the interaction notice by the provider users in the communication-enabled state and a matching of each of the provider users in the communication-enabled state with the characteristic description information.

In some embodiments, the recommended provider user completes a response to the interaction notice and matches the characteristic description information.

In some embodiments, the sending an interaction notice of the browsing event to provider user in a communication-enabled state, respectively, comprises: obtaining characteristic description information of the initiator user; and sending the interaction notice to the provider users in the communication-enabled state and matching with the characteristic description information, respectively.

In some embodiments, the recommended provider user is a provider user who is the first responding to the interaction notice.

In some embodiments, the characteristic description information comprises at least one of the following: identity information of the initiator user, behavioral information of the initiator user, historical interaction information of the initiator user, and historical browsing information of the initiator user.

In some embodiments, the interaction object is a commodity, the provider user is a seller, and the initiator user is a buyer.

In some embodiments, the communication event is implemented by Instant Messaging (IM).

In some embodiments, the method further comprises: sending a request for communication between the initiator user and the provider user in the communication-enabled state to a communication system, causing the communication system to establish the communication event between the initiator user and the provider user in the communication-enabled state.

According to another aspect of the present disclosure, a user recommendation device comprises a processor and a non-transitory computer-readable memory storing instructions that, when executed by the processor, cause the processor to perform a method. The method comprises: detecting a browsing event with respect to an interaction object; obtaining one or more provider users of the interaction object and in a communication-enabled state; and recommending information of the provider users to an initiator user of the browsing event for causing the initiator user to initiate a communication event with respect to the interaction object to the provider users.

According to another aspect of the present disclosure, a user recommendation device is provided, the method comprising: a detecting unit configured to detect a browsing event with respect to an interaction object; an obtaining unit configured to obtain one or more provider users of the interaction object and in a communication-enabled state; and a recommending unit configured to recommend information of the provider users to an initiator user of the browsing event for causing the initiator user to initiate a communication event with respect to the interaction object to the provider user.

It can be seen from the above technical solutions that the present disclosure can obtain corresponding provider users by detecting an interaction object currently browsed by an initiator user, and recommend a provider user in a communication-enabled state to the initiator user, thereby ensuring that the initiator user can conduct online communications with the corresponding provider user to thoroughly learn the information of the interaction object, and facilitating the improvement of interaction efficiency with respect to the interaction object.

DETAILED DESCRIPTION

Online object interactions can be achieved via an interaction platform among any users; in the case where users need to further learn about conditions of an interaction object, it is necessary to ensure that both users are in a communication-enabled state, so as to guarantee that one user can send online query to the other user regarding conditions of the interaction object.

In one example, however, the interaction platform according to the prior art does not provide the state information of each user, namely no user is able to know whether the other user is in a communication-enabled state. After browsing for a while, a user may find that the provider user is not in a communication-enabled state; in another example, the interaction platform according to the prior art provides the state information of each user, but a user usually cares first about an interaction object itself in browsing. As a result, the user spends a lot of time to view the descriptive information regarding the interaction object provided in the interaction platform, and then may find a need to communicate with the provider user, but it is very likely that the provider user is in a communication-disabled state.

As such, with the technical solution according to the prior art, a user would often waste a lot of time and still cannot effectively learn about conditions of an interaction object, leading to a very low efficiency of object interaction.

Therefore, through intelligent recommendation of a provider user, the present disclosure can avoid the above drawbacks in the prior art. To further describe the present disclosure, the following embodiments are provided.

Figure 1:
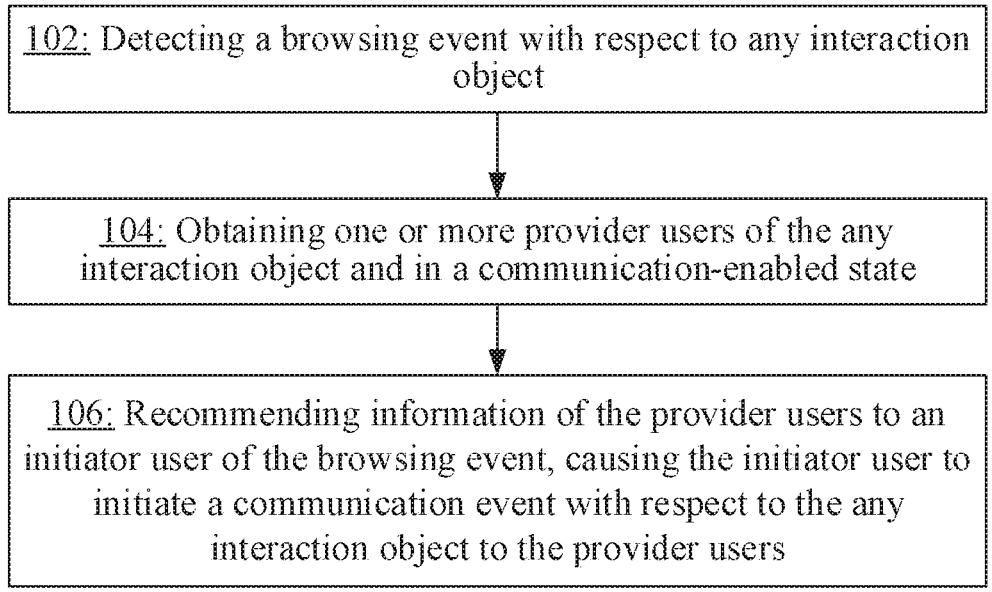
FIG. 1 is a flow chart of a user recommendation method according to an exemplary embodiment of the present disclosure.

FIG. 1 is a flow chart of a user recommendation method according to an exemplary embodiment of the present disclosure. As shown in FIG. 1, the method can be implemented by a server of an interaction platform, and may comprise the following steps.

Step 102 includes detecting a browsing event with respect to any interaction object.

In some embodiments, an initiator user of a browsing event browses a page via a terminal device, and when the browsed page contains interaction objects, it can be considered that the initiator user has initiated a browsing event with respect to any interaction object in the browsed page.

In some embodiments, the interaction platform may be used for interaction operations for any type of interaction objects, which is not limited in the present disclosure. For example, the interaction platform may be an online transaction platform, and the interaction objects may be transaction goods on the online transaction platform, while the initiator user is a buyer of the transaction goods, and the provider user is a seller of the transaction goods.

Step 104 includes obtaining one or more provider users of the any interaction object and in a communication-enabled state.

In some embodiments, there can be many provider users on the interaction platform for the same interaction object. By detecting the state of each provider user, provider users in a communication-enabled state can be obtained. For example, when the account of a provider user on the interaction platform is in a logged-in state, or when a provider user performs operations with respect to the interaction platform within a preset time, it can be considered that the provider user is in a communication-enabled state. Alternatively, as there may be global interaction spanning different time zones, the time zone in which a provider user is located can be obtained, and when the time zone is in an available state (i.e., the local time is working time, for example, between 8:00 am and 12:00 am), it is determined that the provider user is in a communication-enabled state.

Step 106 includes recommending information of the provider users to an initiator user of the browsing event, causing the initiator user to initiate a communication event with respect to the any interaction object to the provider users.

In some embodiments, the initiator user can establish a communication event with the provider user in any manner; for example, a communication event can be implemented by Instant Messaging (IM), which, however, is not limited in the present disclosure.

In some embodiments, a prior association may exist between the interaction platform and a communication system, such that the interaction platform may directly call the communication system to assist the establishment of the communication event between the initiator user and the provider user, which facilitates the improvement of interaction efficiency and simplification of user operations. For example, the interaction platform can send to a communication system a request for communication between the initiator user and the provider user in a communication-enabled state, causing the communication system to establish the communication event between the initiator user and the provider user in a communication-enabled state.

As shown, corresponding provider users can be obtained by detecting an interaction object currently browsed by an initiator user, and a provider user in a communication-enabled state can be recommended to the initiator user, thereby ensuring that the initiator user can conduct online communications with the corresponding provider user to thoroughly learn the information of the interaction object, and facilitating the improvement of interaction efficiency with respect to the interaction object.

Figure 2:
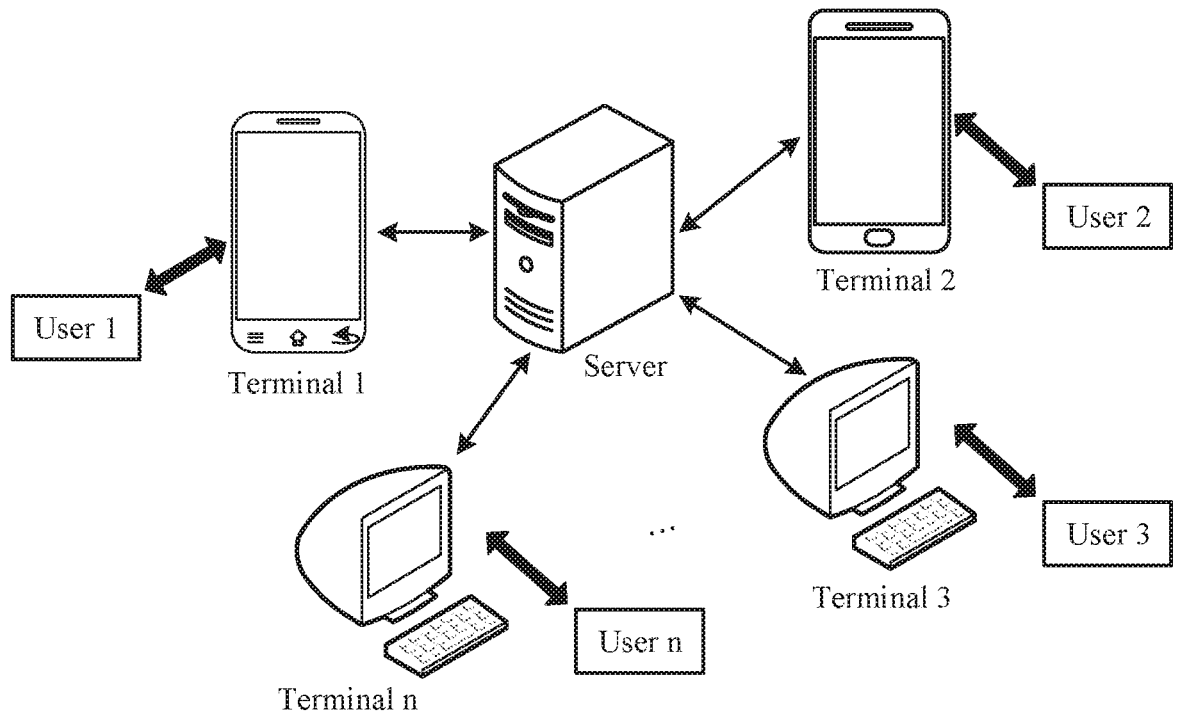
FIG. 2 is a schematic diagram of an application scenario according to an exemplary embodiment of the present disclosure.

FIG. 2 is a schematic diagram of an application scenario according to an exemplary embodiment of the present disclosure. As shown in FIG. 2, operations and various processing functions of the interaction platform are performed on a server. When a user accesses the server via a terminal, the user can access the interaction platform, and then provide interaction objects or browse interaction objects provided by other users on the interaction platform. The terminal may be a mobile device (e.g. the terminal 1 and terminal 2 are smart phones) or other devices (e.g. the terminal 3 is a personal computer), which is not limited in the present disclosure. When object interaction or communication is to be conducted between users, a user needs to log into a registered account on the terminal to enable the interaction platform and other users to know the user's own identity information.

To facilitate the description, an example is used in which the interaction platform is "an online transaction platform", and the interaction platform and the technical solutions of the present disclosure will be described in detail with reference to FIGS. 3-6.

Figure 3:
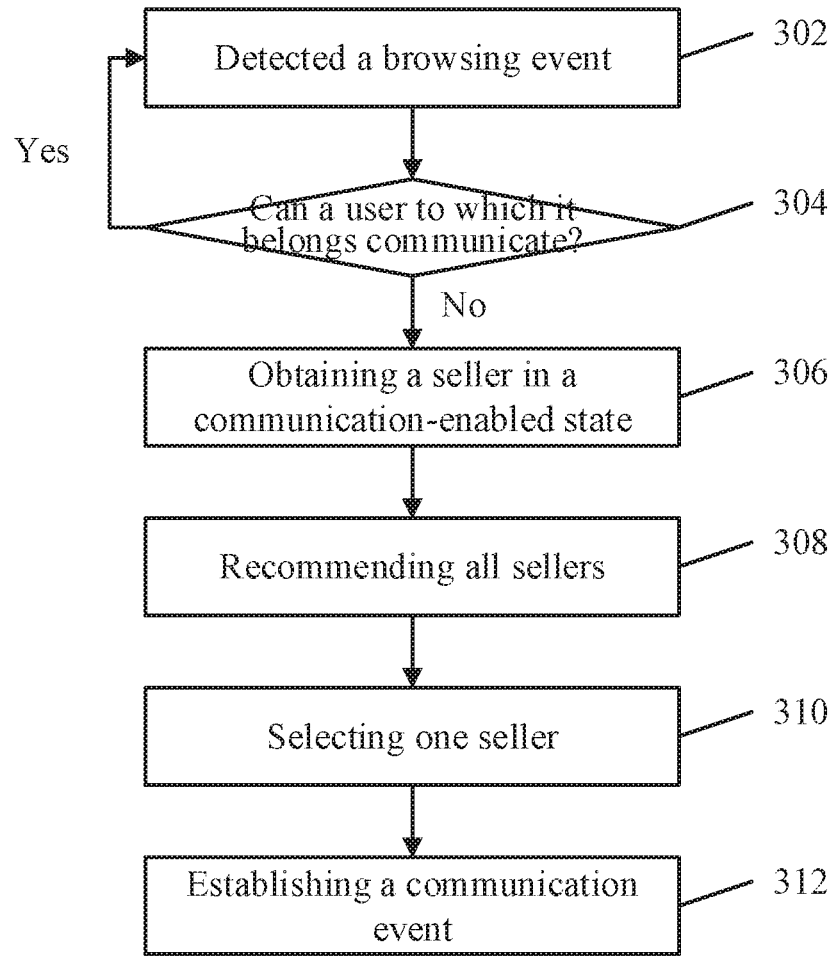
FIG. 3 is a flow chart of another user recommendation method according to an exemplary embodiment of the present disclosure.

FIG. 3 is a flow chart of another user recommendation method according to an exemplary embodiment of the present disclosure. As shown in FIG. 3, the method may comprise the following steps.

Step 302 includes that a server detects a browsing event initiated by a buyer with respect to transaction goods.

In some embodiments, when the interaction platform is an online transaction platform, transaction goods are interaction objects of the platform, and the transaction goods may be real articles or virtual articles. When a buyer browses the online transaction platform via a terminal, the browsing event is detected with respect to all transaction goods on the currently browsed page. For example, the currently browsed page may be a search result display page, a details display page, a goods recommendation page, etc. Here, the detection of a browsing event may be performed with respect to a specific type of pages or transaction goods. For example, only details display pages are detected, only transaction goods that have not been purchased (i.e., interaction objects that have not been interacted) are detected, etc.

Step 304 includes determining whether a seller to which interaction object belongs is in a communication-enabled state; if it is in a communication-enabled state, returning to Step 302; otherwise, proceeding to Step 306.

In some embodiments, the real-time state of the seller can be determined in a variety of manners. For example, when the seller logs into his/her own registered account on the online transaction platform, or when any operation by the seller within a preset time segment (e.g., within 3 min) is detected, it indicates that the seller is very likely to be by the terminal, and it is determined that the seller is in a communication-enabled state; otherwise, it is determined that the seller is in a communication-disabled state.

Step 306 includes obtaining a seller in a communication-enabled state from all sellers that can provide transaction goods that can be browsed.

In some embodiments, a user to which any interaction object (i.e., the transaction goods being browsed) in the browsing event belongs is determined; when the user is in a communication-disabled state, a provider user (i.e., seller) of the any interaction object and in a communication-enabled state is obtained.

By selecting sellers in a communication-enabled state, a buyer can conduct real-time communications with these sellers to promptly learn about any condition of the browsed transaction goods. At the same time, the following situation can be avoided: a buyer has spent a lot of time on browsing transaction goods of a seller, then finds that the seller is in a communication-disabled state, and has to look for other sellers. Therefore, browsing and transaction efficiency can be improved.

Step 308 includes recommending all sellers to the buyer who initiates the browsing event.

In some embodiments, the recommended sellers can be displayed at any position of a terminal screen, for example, within an associated region of the browsed transaction goods (e.g., the periphery), inducing the buyer to visually associate the browsed transaction goods and the recommended sellers.

Step 310 includes selecting at least one seller according to a selection instruction from the buyer.

In some embodiments, the buyer can decide to select a seller, which directly helps reflect the interest and need of the buyer.

Step 312 includes establishing a communication event between the buyer and the selected seller.

In Steps 308-312, the server recommends all provider users in a communication-enabled state to the initiator user; according to a selection instruction input by the initiator user, selects a corresponding provider user from all the recommended provider users; and establishes a communication event with respect to any interaction object between the initiator user and the selected provider user.

In some embodiments, a communication link of "buyer-server-seller" may be established, such that communication messages between the buyer and the seller are forwarded by the server to ensure communication security and stability, and moreover, the server may conduct processing, such as sensitive term filtering and virus protection, on the communication messages; alternatively, the server may notify the buyer and the seller of each other's communication attributes, to establish a communication link of "buyer-seller", such that communication messages are directly transferred between the buyer and the seller to reduce operational burdens on the server.

Figure 4:
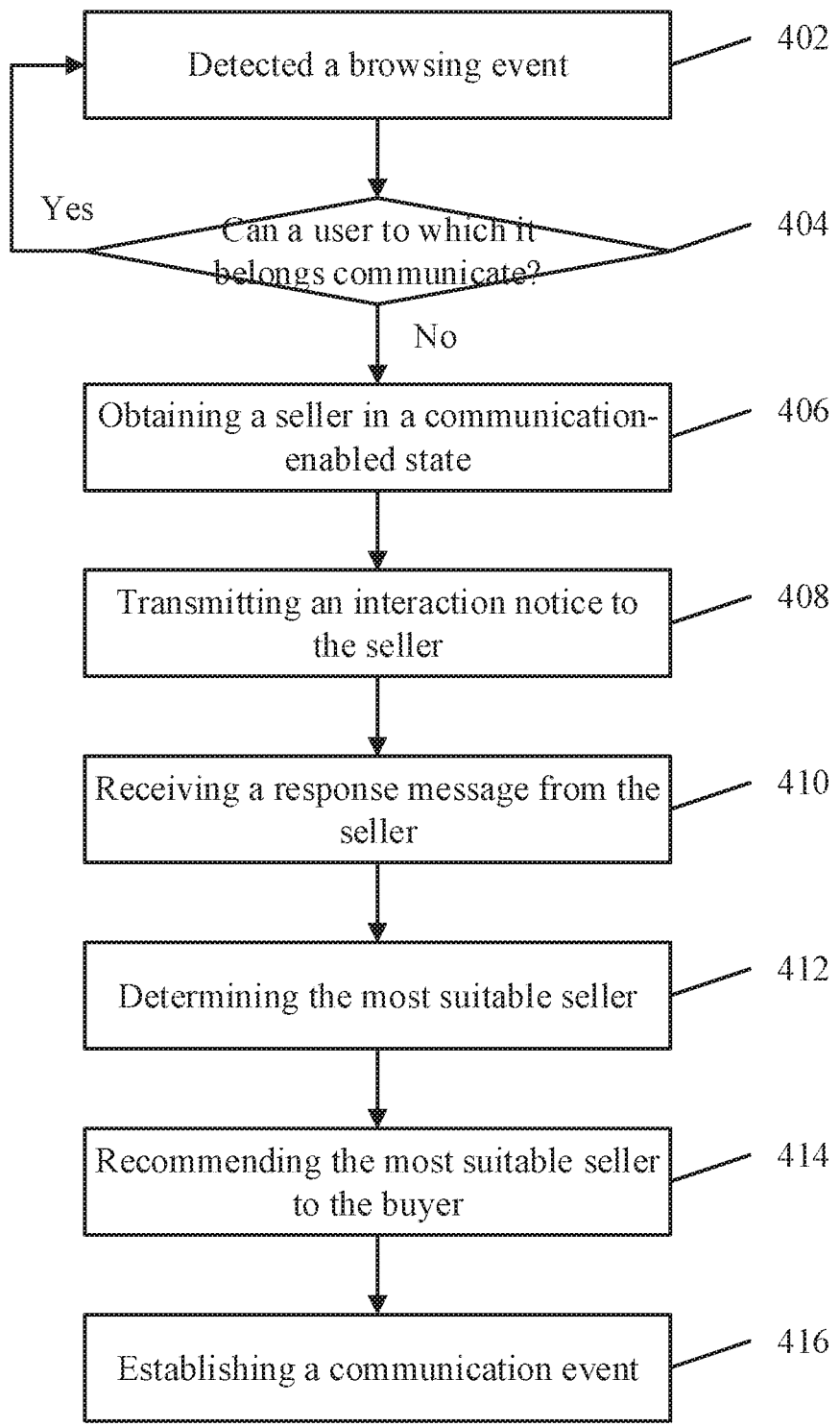
FIG. 4 is a flow chart of yet another user recommendation method according to an exemplary embodiment of the present disclosure.

FIG. 4 is a flow chart of yet another user recommendation method according to an exemplary embodiment of the present disclosure. As shown in FIG. 4, the method may comprise the following steps.

Steps 402-406 are the same as Steps 302-306 shown in FIG. 3, which will not be repeated herein.

Step 408 includes that the server transmits an interaction notice to the seller.

In some embodiments, although the serve can learn whether the seller is in a communication-enabled state, the seller actually may be not in a communication-enabled state, or the seller in a communication-enabled state may not want to execute a transaction (e.g., the browsed transaction goods are out of stock at present, etc.). Therefore, the actual situation and intention of a corresponding seller can be determined by transmitting an interaction notice.

Here, the interaction notice may contain the browsed transaction goods, information of the buyer, etc. In some embodiments, the information of the buyer can be limited to "location" and the like, which does not include name, contact information, and the like to avoid harassment to the buyer.

Step 410 includes that the server receives a response message from the seller.

In some embodiments, when a response message is received, it indicates that the seller has a corresponding transaction intention, and the buyer can communicate with the seller, which will help the buyer further learn about the browsed transaction goods.

Step 412 includes determining the most suitable seller according to the received response messages.

Step 414 includes recommending the most suitable seller to the buyer.

In some embodiments, an interaction notice of the browsing event is sent to each provider user in a communication-enabled state, respectively; according to the response to the interaction notice by each provider user in a communication-enabled state, the most suitable provider user is recommended to the initiator user. By intelligently selecting the most suitable seller, operations by the buyer can be simplified and the autonomous selection by the buyer is avoided, which helps improve the processing efficiency.

Here, as an exemplary implementation manner, the most suitable seller may be the seller who is the first to return a response message.

Step 416 includes establishing a communication event between the buyer and the seller. This step is the same as Step 312 shown in FIG. 3, which will not be repeated herein.

Figure 5:
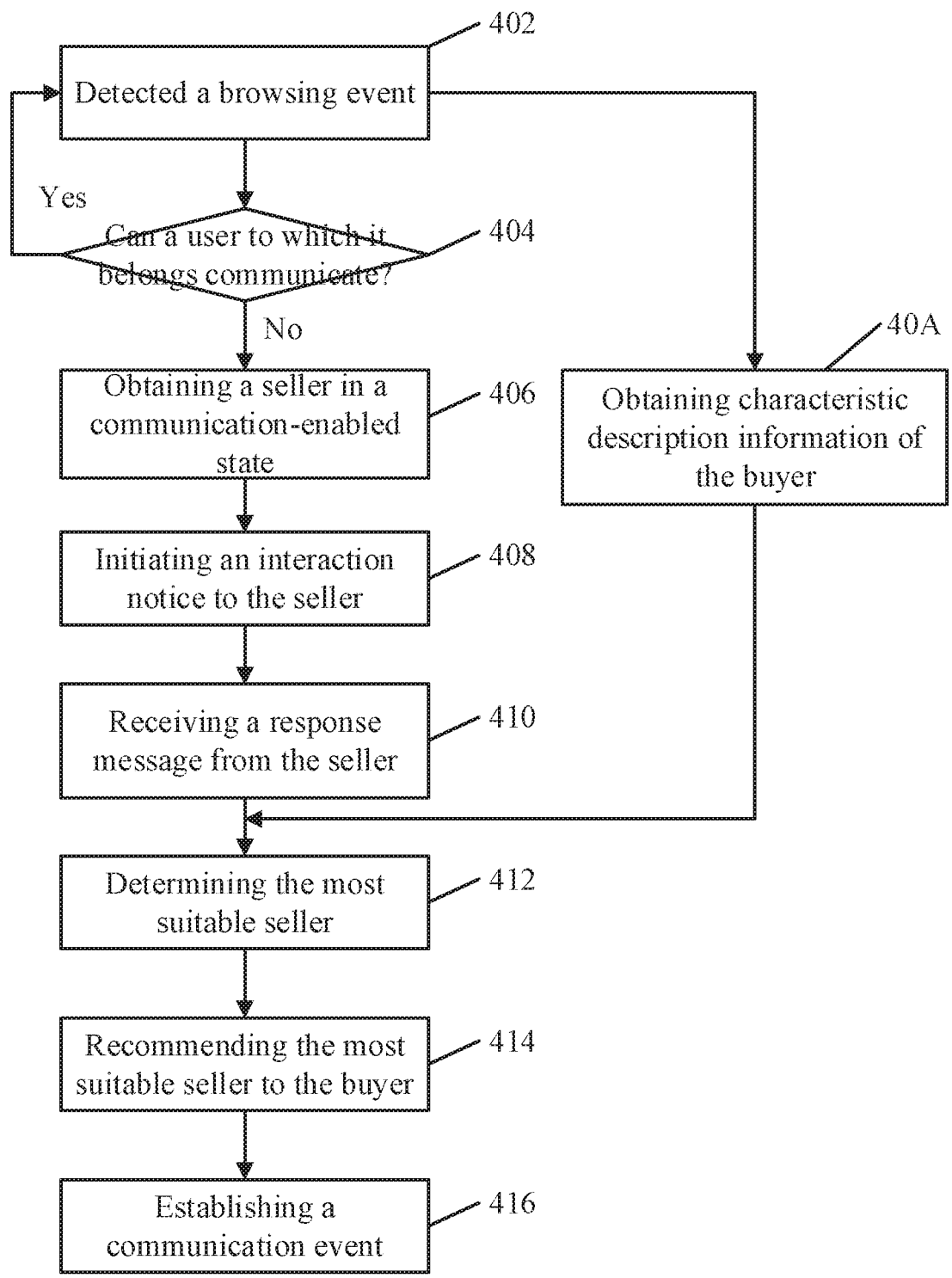
FIG. 5 is a flow chart of yet another user recommendation method according to an exemplary embodiment of the present disclosure.
Figure 6:
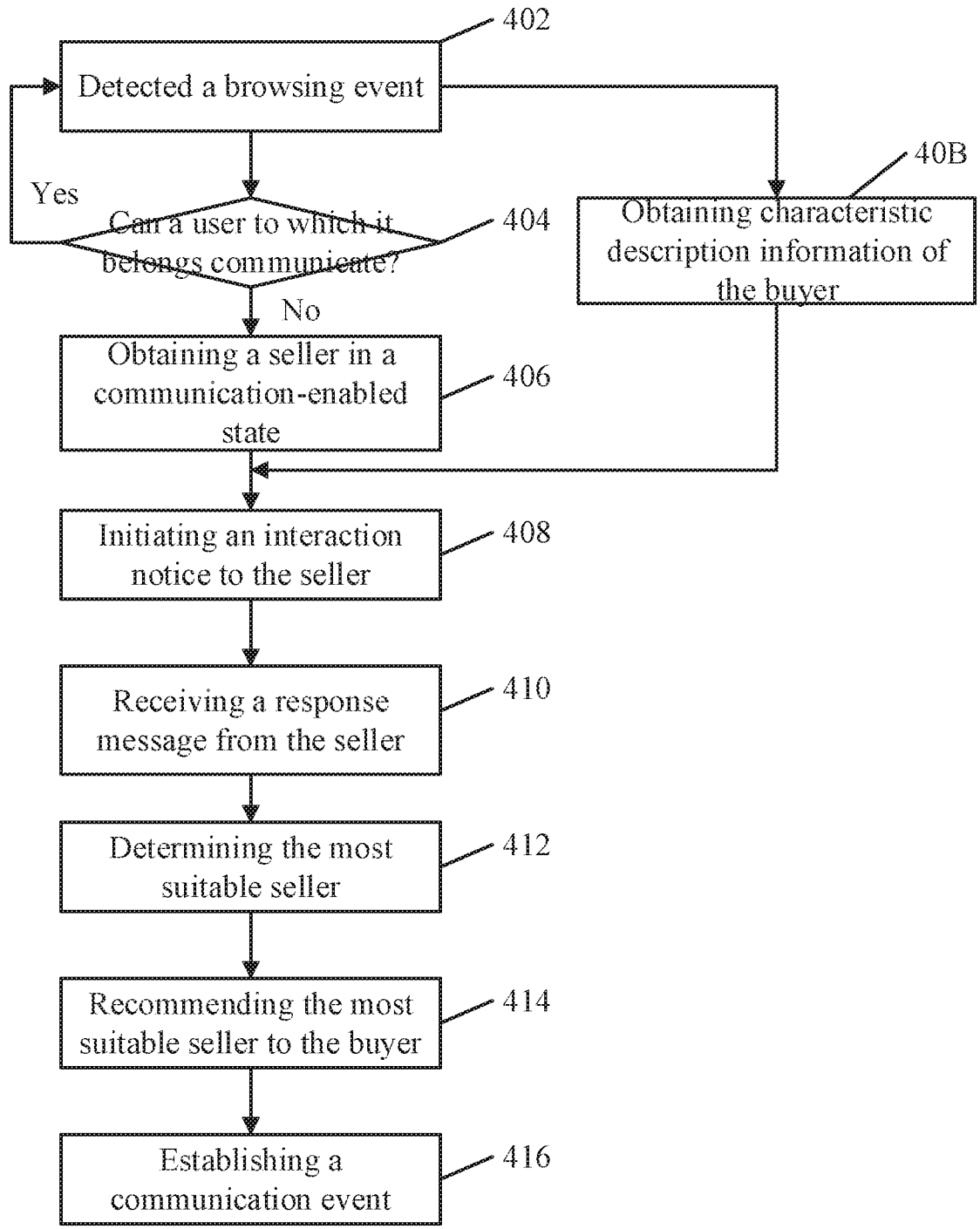
FIG. 6 is a flow chart of yet another user recommendation method according to an exemplary embodiment of the present disclosure.

On the basis of embodiments shown in FIG. 4, the user recommendation process can be further optimized with reference to the actual situation of the buyer seller, thereby obtaining the following embodiments with reference to FIG. 5 and FIG. 6.

FIG. 5 is a flow chart of yet another user recommendation method according to an exemplary embodiment of the present disclosure. As shown in FIG. 5, the method may further comprise, on the basis of the embodiment shown in FIG. 4.

Step 40A includes obtaining characteristic description information of the buyer.

In some embodiments, the characteristic description information may comprise at least one of the following: identity information of the buyer (i.e., the initiator user) (e.g., name, age, gender, home address, etc.), behavioral information of the buyer (e.g., the content of real-time browsing, etc.), historical interaction information of the buyer (e.g., transaction goods purchased in the history, etc.), and historical browsing information of the buyer (e.g., transaction goods browsed in the history, etc.). In some embodiments, any information capable of indicating characteristics of the buyer may be applied in the technical solution of the present disclosure, which is not limited herein.

On the basis of Step 40A, then in Step 412, the server recommends the most suitable provider user, according to the response to the interaction notice by each provider user in a communication-enabled state and the matching of each provider user in a communication-enabled state with the characteristic description information, to the initiator user. Here, as an exemplary implementation manner, the most suitable provider user is a provider user who completes a response to the interaction notice and matches the characteristic description information.

By selecting the most suitable seller according to the response situation and the matching situation, the obtained seller simultaneously meets the needs of both parties to a transaction, which improves use experience of both parties and makes it easier for the transaction to succeed.

FIG. 6 is a flow chart of yet another user recommendation method according to an exemplary embodiment of the present disclosure. As shown in FIG. 6, the method may comprise the following steps.

Step 40B includes obtaining characteristic description information of the buyer. This step is the same as Step 40A shown in FIG. 5, which will not be repeated herein.

On the basis of Step 40B, then in Step 408, the server sends the interaction notice to each provider user in a communication-enabled state and matching with the characteristic description information, respectively. Here, the most suitable provider user is a provider user first responding to the interaction notice.

In the embodiment, sellers are screened based on the matching situation, such that all sellers who receive the interaction notice meet the actual need of the buyer, while the interaction notice is not sent to sellers who do not match. As a result, these sellers will not be disturbed (the interaction notice is meaningless to these sellers and is actually a disturbance to them), and moreover, unsuitable sellers will not be recommended to the buyer, such that the user recommendation operation is more pertinent.

Figure 7:
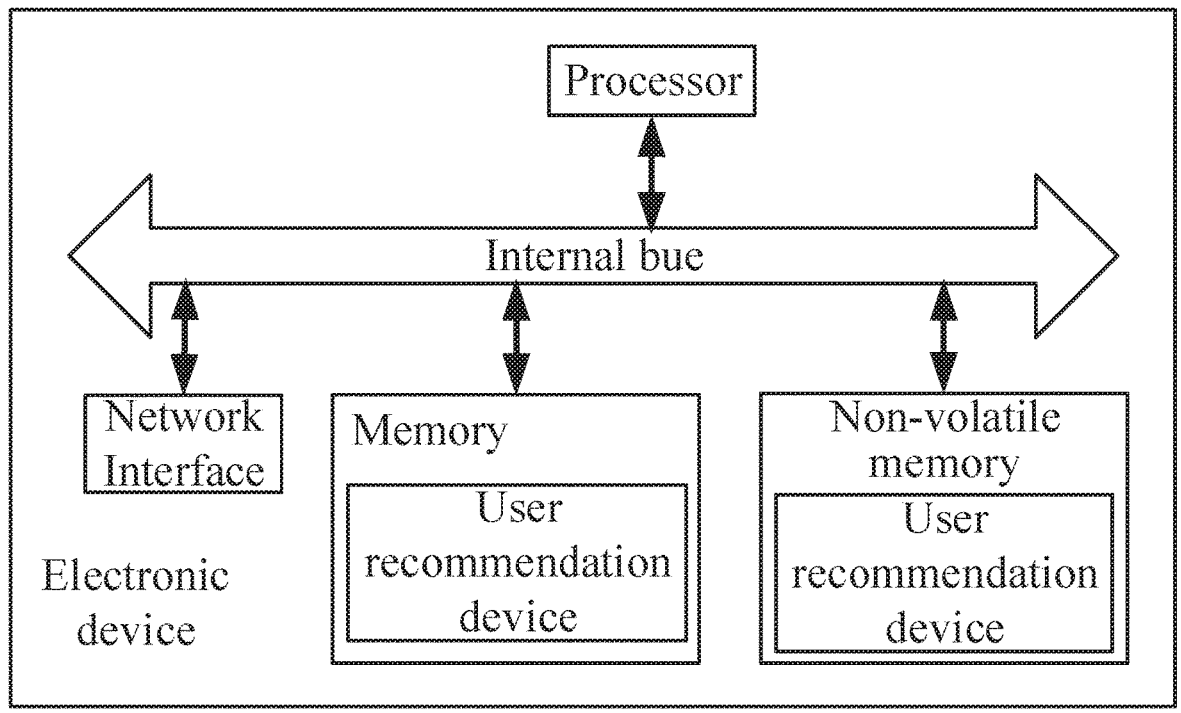
FIG. 7 is a schematic structural diagram of an electronic device according to an exemplary embodiment of the present disclosure.

FIG. 7 is a schematic structural diagram of an electronic device according to an exemplary embodiment of the present disclosure. Referring to FIG. 7, the electronic device comprises, on the hardware level, a processor, an internal bus, a network interface, a memory and a non-volatile storage medium, and may comprise hardware required by other services. The processor reads a corresponding computer program from the non-volatile storage medium into the memory, and then runs the same to form a user recommendation device on the logic level. In addition to the software implementation manner, the present disclosure may not exclude other implementation manners, such as a logic device or a combination of software and hardware. In other words, the execution body of the following processing flow is not limited to all the logic units, but may also be a hardware or logic device.

Figure 8:
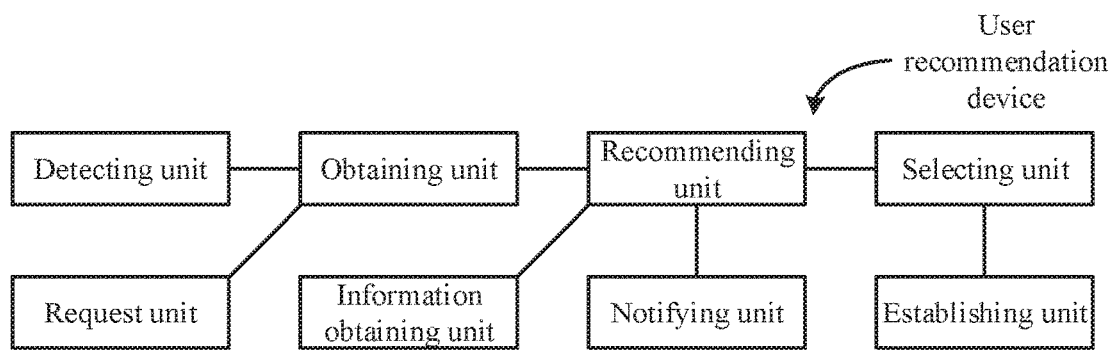
FIG. 8 is a block diagram of a user recommendation device according to an exemplary embodiment of the present disclosure.

Referring to FIG. 8, in the software implementation manner, the user recommendation device may comprise a detecting unit, an obtaining unit, and a recommending unit, wherein: the detecting unit detects a browsing event with respect to any interaction object; the obtaining unit obtains a provider user of the any interaction object and in a communication-enabled state; and the recommending unit recommends information of the provider user to an initiator user of the browsing event, causing the initiator user to initiate a communication event with respect to the any interaction object to the provider user.

Optionally, the obtaining unit is configured to: determine a user to which the any interaction object in the browsing event belongs; when the user is in a communication-disabled state, obtain a provider of the any interaction object and in a communication-enabled state as the provider user.

In some embodiments, the user recommendation device may further comprise: a selecting unit configured to select, when the recommending unit recommends all provider users in a communication-enabled state to the initiator user, a corresponding provider user in all the recommended provider users according to a selection instruction input by the initiator user; an establishing unit configured to establish a communication event with respect to any interaction object between the initiator user and the selected provider user.

In some embodiments, the user recommendation device may further comprise: a notifying unit configured to send an interaction notice of the browsing event to each provider user in a communication-enabled state, respectively; wherein, the recommending unit recommends, according to the response to the interaction notice by each provider user in a communication-enabled state, the most suitable provider user to the initiator user.

In some embodiments, the user recommendation device may further comprise: an information obtaining unit configured to obtain characteristic description information of the initiator user; wherein, the recommending unit recommends, according to the response to the interaction notice by each provider user in a communication-enabled state and the matching of each provider user in a communication-enabled state with the characteristic description information, the most suitable provider user to the initiator user.

Optionally, the most suitable provider user is a provider user who completes a response to the interaction notice and matches the characteristic description information.

Optionally, the notifying unit is configured to: obtain characteristic description information of the initiator user; send the interaction notice to each provider user in a communication-enabled state and matching with the characteristic description information, respectively.

Optionally, the most suitable provider user is a provider user who is the first responding to the interaction notice.

The characteristic description information may comprise at least one of the following: identity information of the initiator user, behavioral information of the initiator user, historical interaction information of the initiator user, and historical browsing information of the initiator user.

In some embodiments, the any interaction object is any commodity, the provider user is a seller, and the initiator user is a buyer.

In some embodiments, the communication event is implemented by Instant Messaging (IM).

In some embodiments, the user recommendation device may further comprise: a request unit configured to send a request for communication between the initiator user and the provider user in a communication-enabled state to a communication system, such that the communication system establishes the communication event between the initiator user and the provider user in a communication-enabled state.

In a typical configuration, the computation device includes one or more Central Processing Units (CPUs), input/output interfaces, network interfaces, and a memory.

The memory may include computer readable media, such as a volatile memory, a Random Access Memory (RAM), and/or a non-volatile memory, e.g., a Read-Only Memory (ROM) or a flash RAM. The memory is an example of a computer readable medium. That is, the memory may couple to the processor and may be a non-transitory computer-readable storage medium storing instructions that, when executed by the processor, cause the processor to perform various steps and methods disclosed herein. The instructions may comprise various units or modules described herein. For example, the units described above and shown in the drawings, e.g., FIG. 8, can be program units stored in the memory. When the processor executes the program units, it causes the electronic device to perform the corresponding steps as described above and shown in the figures.

Computer readable media include permanent, volatile, mobile and immobile media, which can implement information storage through any method or technology. The information may be computer readable instructions, data structures, program modules or other data. Examples of storage media of computers include, but are not limited to, Phase-change RAMs (PRAMs), Static RAMs (SRAMs), Dynamic RAMs (DRAMs), other types of Random Access Memories (RAMs), Read-Only Memories (ROMs), Electrically Erasable Programmable Read-Only Memories (EE-PROMs), flash memories or other memory technologies, Compact Disk Read-Only Memories (CD-ROMs), Digital Versatile Discs (DVDs) or other optical memories, cassettes, cassette and disk memories or other magnetic memory devices or any other non-transmission media, which can be used for storing information accessible to a computation device. According to the definitions herein, the computer readable media exclude transitory media, such as modulated data signals and carriers.

It should be further noted that the terms of "including", "comprising" or any other variants thereof intend to encompass a non-exclusive inclusion, such that a process, method, commodity or device comprising a series of elements not only comprises these elements, but also comprises other elements that are not specifically listed, or further comprises elements that are inherent to the process, method, object or device. When there is no further restriction, elements defined by the statement "comprising one . . . " does not exclude that a process, method, commodity or device comprising the above elements further comprises additional identical elements.

Only preferred embodiments of the present disclosure are described above, which are not used to limit the present disclosure. Any modification, equivalent substitution or improvement made within the spirit and principle of the present disclosure shall be encompassed by the present disclosure.

The invention claimed is:

1. A user recommendation method, characterized in that the method comprises:
    detecting a browsing event with respect to an interaction object belonging to an original provider user, wherein the browsing event is associated with an initiator user;
    determining whether the original provider user is in a communication-enabled state by detecting whether the original provider user performed an operation in a preset past time period;
    in response to the original provider user not being in the communication-enabled state, identifying a plurality of provider users providing the interaction object and determining a communication state of each of the plurality of provider users, wherein the communication state comprises the communication-enabled state or a communication-disabled state;
    identifying one or more provider users in the communication-enabled state from the plurality of provider users;
    sending an interaction notice to each of the one or more provider users in the communication-enabled state, wherein the interaction notice excludes contact information of the initiator user;
    receiving responses to the interaction notice; and
    according to the received responses, recommending a provider user from the one or more provider users for the initiator user to initiate a communication event with respect to the interaction object with the recommended provider user.

2. The method according to claim 1, wherein the method further comprises:
    obtaining characteristic description information of the initiator user; and
    the recommending a provider user from the one or more provider users for the initiator user comprises:

recommending a provider user from the one or more provider users further according to a matching of each of the one or more provider users with the characteristic description information.

3. The method according to claim 2, wherein the recommended provider user completes a response to the interaction notice and matches the characteristic description information.

4. The method according to claim 2, wherein the characteristic description information comprises at least one of the following: identity information of the initiator user, behavioral information of the initiator user, historical interaction information of the initiator user, and historical browsing information of the initiator user.

5. The method according to claim 1, wherein the method further comprises:
obtaining characteristic description information of the initiator user; and
the sending an interaction notice to each of the one or more provider users in the communication-enabled state comprises:
sending the interaction notice to one or more provider users in the communication-enabled state that each match the characteristic description information.

6. The method according to claim 1, wherein the recommended provider user is a provider user who is the first to respond to the interaction notice.

7. The method according to claim 1, wherein the interaction object is a commodity, the recommended provider user is a seller, and the initiator user is a buyer.

8. The method according to claim 1, further comprising:
sending a request for communication between the initiator user and the recommended provider user to a communication system, causing the communication system to establish the communication event between the initiator user and the recommended provider user.

9. A user recommendation device, comprising a processor and a non-transitory computer readable memory storing instructions that, when executed by the processor, cause the processor to perform operations comprising:
detecting a browsing event with respect to an interaction object belonging to an original provider user, wherein the browsing event is associated with an initiator user;
determining whether the original provider user is in a communication-enabled state by detecting whether the original provider user performed an operation in a preset past time period;
in response to the original provider user not being in the communication-enabled state, identifying a plurality of provider users providing the interaction object and determining a communication state of each of the plurality of provider users, wherein the communication state comprises the communication-enabled state or a communication-disabled state;
identifying one or more provider users in the communication-enabled state from the plurality of provider users;
sending an interaction notice to each of the one or more provider users in the communication-enabled state, wherein the interaction notice excludes contact information of the initiator user;
receiving responses to the interaction notice; and
according to the received responses, recommending a provider user from the one or more provider users for the initiator user to initiate a communication event with respect to the interaction object with the recommended provider user.

10. The device according to claim 9, wherein the operations further comprise:
obtaining characteristic description information of the initiator user; and
the recommending a provider user from the one or more provider users for the initiator user comprises:
recommending a provider user from the one or more provider users further according to with the characteristic description information.

11. The device according to claim 10, wherein the recommended provider user completes a response to the interaction notice and matches the characteristic description information.

12. The device according to claim 10, wherein the recommended provider user is a provider user who is the first to respond to the interaction notice, and the characteristic description information comprises at least one of the following: identity information of the initiator user, behavioral information of the initiator user, historical interaction information of the initiator user, and historical browsing information of the initiator user.

13. The device according to claim 9, wherein the operations further comprise:
obtaining characteristic description information of the initiator user; and
the sending an interaction notice to each of the one or more provider users in the communication-enabled state comprises:
sending the interaction notice to one or more provider users in the communication-enabled state that each match the characteristic description information, respectively.

14. The device according to claim 9, further comprising:
sending a request for communication between the initiator user and the recommended provider user to a communication system, causing the communication system to establish the communication event between the initiator user and the recommended provider user.

15. A non-transitory computer-readable storage medium for user recommendation configured with instructions executable by one or more processors to cause the one or more processors to perform operations comprising:
detecting a browsing event with respect to an interaction object belonging to an original provider user, wherein the browsing event is associated with an initiator user;
determining whether the original provider user is in a communication-enabled state by detecting whether the original provider user performed an operation in a preset past time period;
in response to the original provider user not being in the communication-enabled state, identifying a plurality of provider users providing the interaction object and determining a communication state of each of the plurality of provider users, wherein the communication state comprises the communication-enabled state or a communication-disabled state;
identifying one or more provider users in the communication-enabled state from the plurality of provider users;
sending an interaction notice to each of the one or more provider users in the communication-enabled state, wherein the interaction notice excludes contact information of the initiator user;
receiving responses to the interaction notice; and
according to the received responses, recommending a provider user from the one or more provider users for the initiator user to initiate a communication event with respect to the interaction object with the recommended provider user.

\* \* \* \* \*